Dec. 12, 1933.  S. E. SHEPPARD ET AL  1,939,232
CHEMIGRAPHIC MATERIALS
Filed July 13, 1932
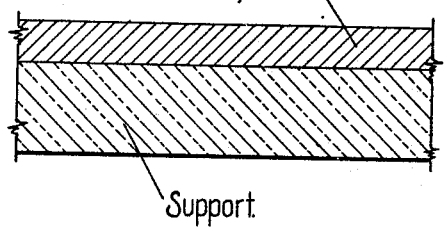
Sensitive Layer Containing A Substance Capable Of Darkening When Heated In Presence Of Catalyst; e.g. An Oxalate Of A Heavy Metal.
Support.
Inventors:
Samuel E. Sheppard & Waldemar Vanselow,
By Newton M. Perrins
Attorney.

Patented Dec. 12, 1933

1,939,232

UNITED STATES PATENT OFFICE 1,939,232

CHEMIGRAPHIC MATERIALS

Samuel E. Sheppard and Waldemar Vanselow, Rochester, N. Y., assignors to Eastman Kodak Company, Rochester, N. Y., a corporation of New York Application July 13, 1932. Serial No. 622,310

11 Claims. (Cl. 41—20)

This invention relates to a process of recording, printing, or transferring designs in which certain chemical reactions and heat are employed. In the present invention heat is employed to render the image visible or more intense in color and certain chemical substances are employed in the role of catalysts to promote the darkening reaction under the influence of heat.

The present invention uses, among others, certain sensitive layers of the type which we have described in a copending application Serial No. 501,663, filed December 11, 1930. The chemical reactions involved and the process itself are, however, distinguished from the earlier one in several respects. In our former application use was made of the sensitivity of the layers to light, particularly ultra-violet, and the image was developed by heat. Also in these former layers all of the constituents entering into the reaction were present in a single coating. In the present process light sensitivity plays no part, one of the constituents entering into the reaction is applied separately and locally if desired and the image is developed by heat applied either locally or generally. The distinctions between the two processes will be more readily apparent from the following specification.

The invention is also distinguished from previous processes which have been proposed in which coatings have been made containing salts of certain metals and sulfur-containing compounds. In these methods the reaction has been between the metal ion and the sulfur ion of the sulfur-containing compound to form a metallic sulfide which reaction is promoted by the action of heat. In other cases where sulfides are not used it is stated that the image finally developed consists of the oxides, hydroxides or halides of the metals. In our present process a relatively small proportion of a metallic sulfide is formed but the action of heat is to carry out a thermal decomposition which results in a substantial proportion of free metal in the resulting image.

The mechanism of the reactions underlying our process has been briefly described by us in the "Journal of the American Chemical Society" 52, 3468, August, 1930. The theory as we understand it may be illustrated with the case of silver oxalate. Silver oxalate is chosen merely by way of example, other compounds behaving in an analogous manner.

Silver oxalate undergoes, as is well known, a thermal decomposition as follows:

$$Ag_2C_2O_4 \rightarrow 2Ag + 2CO_2$$

This reaction proceeds at a relatively slow rate, but is auto-catalyzed by the silver nuclei formed so that the decomposition is gradually accelerated. We have found that this reaction can be greatly accelerated by producing silver sulfide nuclei on the silver oxalate. This we do by treating the silver oxalate layer with a substance containing a sulfur ion or elementary sulfur, or in some cases either the iron or elementary form of selenium or tellurium. In the latter cases the catalyst is probably silver selenide or silver telluride. In the case of the sulfur bearing bodies, for example, a very minute amount of the sulfur ion is necessary to form silver sulfide nuclei in sufficient numbers to very greatly accelerate the thermal decomposition to metal.

It is not certain whether the catalysis is due to interaction of sulfur ions with silver ions

thus presenting silver sulfide directly, or whether the silver sulfide is formed by the reaction

where the silver atoms are activated and the sulfur is in its elementary but un-ionized form. In any case the speeding up of the decomposition is enormous.

It will be seen that the reaction is different from that in the case where larger amounts of the sulfur-containing substances are necessary and the product formed is substantially metal sulfide or the like. There is shown on the single figure of the drawing an enlarged cross section of a sensitive element useful in the process herein described, the elements thereof being described by suitable legends.

Practical illustrations of our invention will now be given.

Example I

An emulsion of silver oxalate may be prepared as follows:

Solution A

| | Parts |
|---|---|
| Silver nitrate | 10 |
| Water | 100 |
| Gelatin | 6 |
| Nitric acid | 0.5 |

Solution B

| | Parts |
|---|---|
| Potassium oxalate | 12 |
| Water | 100 |
| Gelatin | 6 |

Solution A is added to Solution B with vigorous stirring. This gelatin silver oxalate emulsion may then be used to coat any desirable support such as paper, for example.

The catalyzing solution may be a dilute aqueous or alcoholic solution with or without coloring matter to render it visible containing about 0.1 to 0.5% of sodium tetrathionate, sodium thiosulfate or ammonium thiocyanate. If this solution is used to write, or print upon the silver oxalate layer and the layer is then heated the design or printing will appear in quite a strong contrast with the background. The heating in this case may be general, that is, the entire layer may be heated. The temperature of the heat treatment will be approximately of the range of 80° to 120° C. The heating may be done, for example, by means of an electric flat iron.

*Example II*

Instead of preparing an emulsion of silver oxalate and coating it upon the paper, the paper may be run through a solution of metal salt and then through a potassium oxalate solution and finally allowed to dry. For this purpose the paper is first run through the following solution:

| | Parts |
|---|---|
| Silver nitrate | 25 |
| Water | 500 |

The paper is then allowed to drain to a damp condition and is then run through a solution of 25 parts of potassium oxalate to 500 parts of water. It is then allowed to dry. It is treated as before with any of the catalyzing solutions mentioned and is heated to develop the design or writing.

*Example III*

The paper is first run through the following solution:

| | Parts |
|---|---|
| Lead acetate | 25 |
| Acetic acid glacial | 3 |
| Water | 500 |

After draining as before, it is then run through the solution of 25 parts of potassium oxalate in 500 parts of water and then dried. In this case suitable catalysts are solutions of potassium selenocyanide or ammonium thiosulfate of about $\frac{1}{10}$ to $\frac{1}{50}$% concentration. The method is as given above, that is, the writing or printing is done on the paper with the solution containing the catalyst and development is by heat as described.

*Example IV*

The procedure is as described under Example III except that the paper is first immersed in:

| | Parts |
|---|---|
| Mercuric nitrate | 25 |
| Nitric acid (conc.) | 10 |
| Water | 500 |

Suitable catalysts are ammonium thiosulfate and sodium tetrathionate.

*Example V*

The paper is run through the following solution:

| | Parts |
|---|---|
| Thallous nitrate | 10 |
| Water | 100 |

After draining to dampness the paper is run through a solution of 25 parts of potassium oxalate in 500 parts of water. It is then dried.

A suitable catalyst is colloidal silver sulfide. This may be made by passing hydrogen sulfide ($H_2S$) into a 0.01 molar solution of silver nitrate until a pale tan color is produced, and then removing excess hydrogen sulfide by passing nitrogen through the solution.

The paper is handled and developed by heat as before.

*Example VI*

The paper is run through the following:

| | Parts |
|---|---|
| Silver nitrate | 25 |
| Water | 500 |

After draining it is then run through:

| | Parts |
|---|---|
| Adipic acid | 7.5 |
| Water | 500.0 |

It is then dried.

Suitable catalysts are thiourea or sodium tetrathionate at a concentration of from 0.1 to 0.5%.

It is to be understood that in any of the examples given the metallic salt may be either made in the form of an emulsion with any suitable colloid or it may be precipitated in the fibers of the paper, whichever is most convenient. It is also understood, of course, that while paper is given by way of illustration, any suitable support may be employed.

The following table includes a number of metal salts and catalysts which have been found satisfactory:

| Metal Salt | Catalyst |
|---|---|
| Silver oxalate | Sodium tetrathionate |
| Silver oxalate | Sodium thiosulfate |
| Silver oxalate | Ammonium thiocyanate |
| Silver succinate | Sodium tetrathionate |
| Silver succinate | Thiourea |
| Silver adipate | Sodium tetrathionate |
| Silver adipate | Thiourea |
| Lead oxalate | Potassium selenocyanide |
| Lead oxalate | Ammonium thiosulfate |
| Thallous oxalate | Silver sulfide |
| Mercurous oxalate | Sodium selenide |
| Mercurous oxalate | Tellurium dichloride |
| Mercuric oxalate | Ammonium thiosulfate |
| Mercuric oxalate | Sodium tetrathionate |

These combinations are given by way of example only. A large number of catalysts is available for use with any of these substances but those mentioned will probably prove as satisfactory as any. It is, of course, only logical that some will give better results than others.

Our invention may be put to numerous uses and the process may be applied in several different ways.

In one embodiment, for example, the catalyst may be used as an ink in a recording instrument, the record then being made visible and permanent by the application of heat, which may be done, for example, by passing the record over a heated surface.

In another embodiment a record paper which is coated, for example, with a silver oxalate or a mercurous oxalate emulsion is coated or brushed with a solution of the catalyst. A pyro recorder which uses a heated stylus or a jet of hot gas may then be employed to develop the record.

Another embodiment of our invention has been described and claimed in the Patent 1,917,370, granted July 11, 1933, to K. C. D. Hickman. In this modification the catalyzing solution is made up with a little coloring matter and a suitable vehicle as an ink for use on a hectograph machine. The writing made in this catalyst is pressed against a gelatin pad and sheets of paper containing a metal compound such as mercuric oxalate are then pressed against the gelatin transfer pad. On heating, the transfer, type, or design is intensified to a dark contrasting color.

Other applications of our process are also possible.

It is to be noted also that our process is capable of variations in the method of applying the catalyst and in the method of heating. The catalyst may be applied generally and the heating may be local, as by stylus, for example, or a catalyst may be applied locally by transfer or by writing and the heating may be general, or it might conceivably be of advantage to apply both generally.

Many variations in the composition of the coatings may be made and many variations are likewise possible in the composition and constituents of the catalyzing solutions. All of these modifications and equivalents we consider as included within our invention as expressed in the appended claims.

What we claim as our invention and desire to be secured by Letters Patent of the United States is:

1. A process of recording which comprises treating a layer containing a substance which is capable of darkening under the influence of heat with a substance which catalyzes the darkening reaction, thereby producing a substantial proportion of free metal, and then heating the layer to develop an image.

2. A process of recording which comprises treating locally a layer containing a substance which is capable of darkening under the influence of heat with a substance which catalyzes the darkening reaction, thereby producing a substantial proportion of free metal, and then heating the layer generally to develop an image.

3. A process of recording which comprises treating generally a layer containing a substance which is capable of darkening under the influence of heat with a substance which catalyzes the darkening reaction, thereby producing a substantial proportion of free metal, and then heating the layer locally to develop an image.

4. A process of recording which comprises treating a layer containing a salt of a metal selected from the group consisting of the silver salts of saturated dibasic acids of less than 7 carbon atoms, with a substance which catalyzes the darkening reaction, thereby producing a substantial proportion of free metal, and then heating the layer to develop an image.

5. A process of recording which comprises treating a layer containing a salt of a metal selected from the group consisting of the oxalates of silver, lead, thallium and mercury, with a substance which catalyzes the darkening reaction, thereby producing a substantial proportion of free metal, and then heating the layer to develop an image.

6. A process of recording which comprises treating a layer containing a metal salt which is capable of thermal decomposition to free metal with a substance which catalyzes said decomposition, and then heating the layer to develop an image substantially of free metal.

7. A process of recording which comprises treating a layer containing a metal salt which is capable of thermal decomposition to free metal with a substance selected from the group consisting of the sulphur, selenium, and tellurium compounds capable of yielding sulphur, selenium and tellurium ions respectively or these metals in their elementary form, and then heating the layer to develop an image substantially of free metal.

8. A process of recording which comprises treating a layer containing a metal salt which is capable of thermal decomposition to free metal with a substance selected from the group consisting of elementary sulphur and the sulphur compounds capable of yielding a free sulphur ion, and then heating the layer to develop an image substantially of free metal.

9. A process of recording which comprises treating a layer containing silver oxalate with a solution containing ammonium thiocyanate, and then heating the layer to develop an image substantially of free silver.

10. A process of recording which comprises treating a layer containing silver adipate with a solution containing thiourea, and then heating the layer to develop an image substantially of free silver.

11. A process of recording which comprises treating a layer containing thallous oxalate with a solution containing silver sulphide, and then heating the layer to develop an image substantially of free thallium.

SAMUEL E. SHEPPARD.
WALDEMAR VANSELOW.